(12) United States Patent  
Mazumder et al.

(10) Patent No.: US 7,820,939 B2
(45) Date of Patent: Oct. 26, 2010

(54) ZERO-GAP LASER WELDING

(75) Inventors: Jyotirmoy Mazumder, Ann Arbor, MI (US); Ashish K. Dasgupta, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 609 days.

(21) Appl. No.: 11/658,446

(22) PCT Filed: Jul. 27, 2004

(86) PCT No.: PCT/US2004/024080

§ 371 (c)(1),
(2), (4) Date: Jan. 26, 2007

(87) PCT Pub. No.: WO2006/022642

PCT Pub. Date: Mar. 2, 2006

(65) Prior Publication Data

US 2008/0302768 A1    Dec. 11, 2008

(51) Int. Cl.
*B23K 26/32* (2006.01)
(52) U.S. Cl. .................. 219/121.64; 148/434; 148/525
(58) Field of Classification Search ............ 219/121.63, 219/121.64; 148/525, 413, 434; 228/262.41, 228/262.44; 428/385, 560, 594
See application file for complete search history.

(56) References Cited

U.S. PATENT DOCUMENTS

| | | | |
|---|---|---|---|
| 3,969,604 A | | 7/1976 | Baardsen |
| 4,225,090 A | * | 9/1980 | Kako et al. ................. 239/692 |
| 4,552,719 A | * | 11/1985 | Morimoto et al. ............... 419/2 |
| 4,830,084 A | * | 5/1989 | Singer ........................ 164/46 |
| 5,635,306 A | * | 6/1997 | Minamida et al. ........... 228/181 |
| 5,648,123 A | * | 7/1997 | Kuhn et al. ................. 427/448 |
| 6,036,083 A | * | 3/2000 | Luo et al. ................... 228/223 |
| 6,276,592 B1 | * | 8/2001 | Jochmann et al. ........... 228/121 |

(Continued)

FOREIGN PATENT DOCUMENTS

JP  5-318155 A  * 12/1993

(Continued)

OTHER PUBLICATIONS

Suryanarayana et al., "The science and technology of mechanical alloying", Dec. 2001, Elsevier Science, A304-306, pp. 151-158.*

(Continued)

*Primary Examiner*—Geoffrey S Evans
(74) *Attorney, Agent, or Firm*—Harness, Dickey & Pierce, P.L.C.

(57) ABSTRACT

A method for laser welding a pair of overlapping metal members together and a weld joint produced by the method. At least one of the metal members has a protective metal coating. The method includes applying a thin layer of an alloying agent on at least one of the metal members between the metal members, melting the protective metal coating and the alloying agent to form an alloy that is disposed between the overlapping members with zero gap, welding the overlapping metal members together to form a weld, and controlling the amount of the alloying agent such that the extended solid solubility of the alloying agent in the weld is not exceeded.

20 Claims, 7 Drawing Sheets

U.S. PATENT DOCUMENTS 6,479,168 B2 * 11/2002 Mazumder et al. ..... 219/121.64
2004/0031561 A1 * 2/2004 Ely et al. ............... 219/121.64
2004/0074882 A1 * 4/2004 Speranza et al. ....... 219/121.64

FOREIGN PATENT DOCUMENTS

JP         2002-361461 A * 12/2002

OTHER PUBLICATIONS

Dsgupta et al., "A Novel method for Lap Welding of Automotive Sheet Steel Using High Power CW CO2 Laser", Sep. 2005, Proceedings of the 4th international Congress on Laser Advanced Materials Processing, pp. 1-5.*

Machine translation of Japan Patent No. 2002-361,461, May 2010.*

* cited by examiner

— 1 —

ZERO-GAP LASER WELDING

FIELD OF THE INVENTION

The present invention generally relates to laser welding and, more particularly, to low-porosity zero-gap laser welding of overlapping metal plates, such as zinc-coated steel plates, or multi-coated zinc plates.

BACKGROUND

Zinc-coated steel is extensively used in the automotive industry because of its low cost, availability and corrosion resistive properties. Zinc-coated steel is, for example, the preferred material for manufacturing automobile bodies, which are generally joined by fusion welding. However, lap welding of zinc-coated steel presents a challenge for manufacturing engineers because of the low boiling point of zinc (907° C.) and the high melting point of steel (1530° C.). In lap welding of such steel, the sandwiched zinc layers boil explosively at the weld interface resulting in undesirable high porosity in the welded joints.

While various methods have been developed for lap welding of zinc-coated steel, such methods can, nevertheless, be the subject of certain improvements. In this regard, conventional methods for lap welding of zinc-coated steel are not sufficiently efficient and robust for large scale production. Thus, it would be advantageous to provide robust, reliable and efficient methods for lap welding of zinc-coated steel for commercial production.

SUMMARY

The present teachings provide a method for laser welding a pair of overlapping metal members together. At least one of the metal members has a protective metal coating. The method includes applying a thin layer of an alloying agent on at least one of the metal members between the metal members, melting the protective metal coating and the alloying agent to form an alloy that is disposed between the overlapping members with zero gap, welding the overlapping metal members together to form a weld, and controlling the amount of the alloying agent such that the extended solid solubility of the alloying agent in the weld is not exceeded.

The present teachings provide a method for laser welding a pair of metal members together. At least one of the metal members has a protective metal coating. The method includes applying a thin layer of an alloying agent on at least one of the metal members, placing one end of one of the metal members in overlapping relation to one end of the other metal member to form an overlapping section with zero gap, such that the alloying agent is between the first and second members in the overlapping section, and laser welding the metal members and alloying agent together to form a weld, such that the protective metal coating becomes substantially alloyed with the alloying agent to form an alloy, and such that the extended solid solubility limit of the alloying agent in the weld is not substantially exceeded.

The present teachings provide a weld joint formed by laser welding. The weld joint includes a pair of overlapping metal members defining an overlapping section with at least one of the metal members having a protective coating. The weld joint also includes an alloy layer between the overlapping metal members at the overlapping section, wherein the alloy layer is formed by the protective coating and a thin coating of an alloying agent on at least one of the overlapping metal members. The weld joint also includes a weld formed from a metal melt pool of the metal members, wherein the extended solid solubility limit of the alloying agent in the weld is not exceeded.

Further areas of applicability of the present invention will become apparent from the detailed description provided hereinafter. It should be understood that the detailed description and specific examples, while indicating various embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description is merely exemplary in nature and is in no way intended to limit the invention, its application, or uses.

Figure 1:
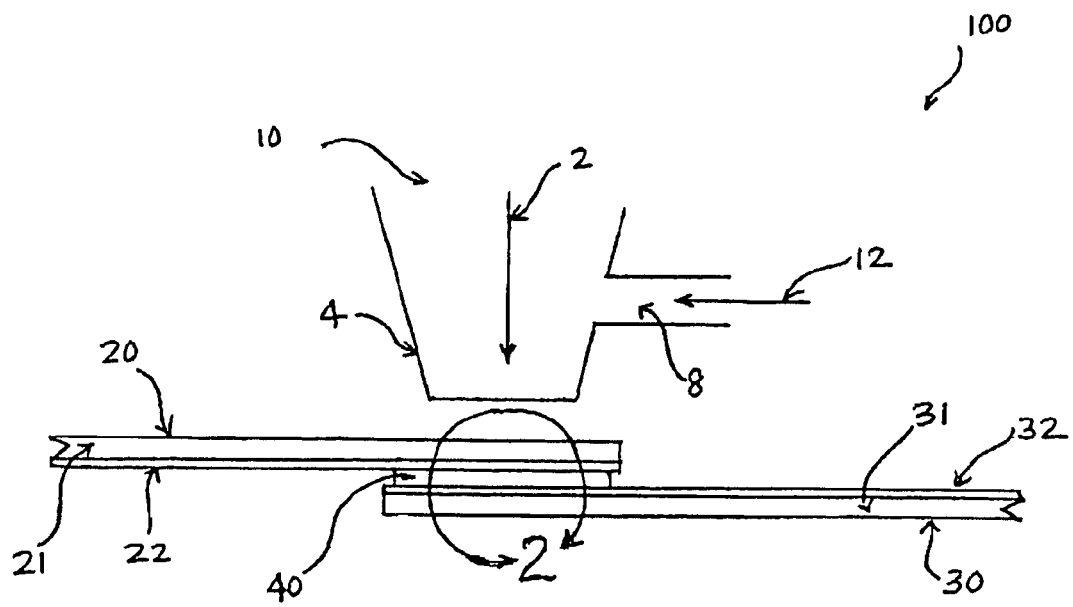
FIG. 1 is an exemplary partial cross-sectional view of a pair of overlapping members with a protective coating and an alloying agent therebetween according to the present teachings, shown in preparation for laser welding under the nozzle of a laser welder.

Referring to FIG. 1, an exemplary joint 100 in preparation for welding according to the present teachings includes a first metal member 20, a second metal member 30 and a thin layer/coating of alloying agent 40, such as copper, between the overlapping metal members 20, 30. The alloying agent 40 can be applied on only one or on both metal members 20, 30. Such an application can also achieve a zero-gap laser welding between the overlapping metal members 20, 30. The welded joint 100 is formed by a laser welder 10. The laser welder 10 includes a laser beam 2 projected from a laser (not shown) through a nozzle 4, as is conventionally known in the art. The distance of the nozzle 4 from the metal members 20, 30 can range from a few millimeters to meters. Shielding gas 12, such as Helium, Argon, Nitrogen, air, or combinations thereof, is pumped through an aperture 8 into the nozzle 4. The laser beam 2 is focused to be incident on the top metal member 20, but the focus position can vary (above, on, or below the top surface) depending on the thickness of the metal members 20, 30. Helium is generally used as the major shielding gas for producing sound and shiny welds.

One end of the first metal member 20 overlaps one end of the second metal member 30. The first metal member 20 can be a plate 21 made of steel with a protective layer 22, such as zinc. The second metal member 30 can be a plate 31 made of steel, which is shown also with a protective layer 32, such as zinc. However, the present teachings are not limited to joints in which both metal members are coated with protective layers. Overlapping joints in which only one of the two metal members has a protective layer can also be used. The metal plates 21 and 31 are, by way of example only, 0.8 mm and 1.0 mm thick respectively, and the protective metal layers 22 and 32 are formed of zinc in the amount of 70 grams per square meter. Other steel thicknesses and protective coating weights are also within the scope of the invention, as well as other material combinations, as will be described below.

The alloying agent 40 can be copper powder with different mesh sizes, for example a 325 mesh size (~40 micron). Copper powder can be applied to the weld zone in presence of a binder or directly. Copper is chosen mainly because of its good alloyability with zinc and its melting point of 1083° C. which is lower than the melting point of 1530° C. of steel.

The layer of the alloying agent 40 ensures a zero gap between the overlapping steel plates (zero-gap laser welding). During welding, copper melts between the steel plates. This molten-copper alloys with zinc and provides an escape route for the un-alloyed explosive zinc vapors that are created during melting of the zinc of the protective coating. As a result, most of the zinc is retained in the weld in alloyed form.

Figure 3:
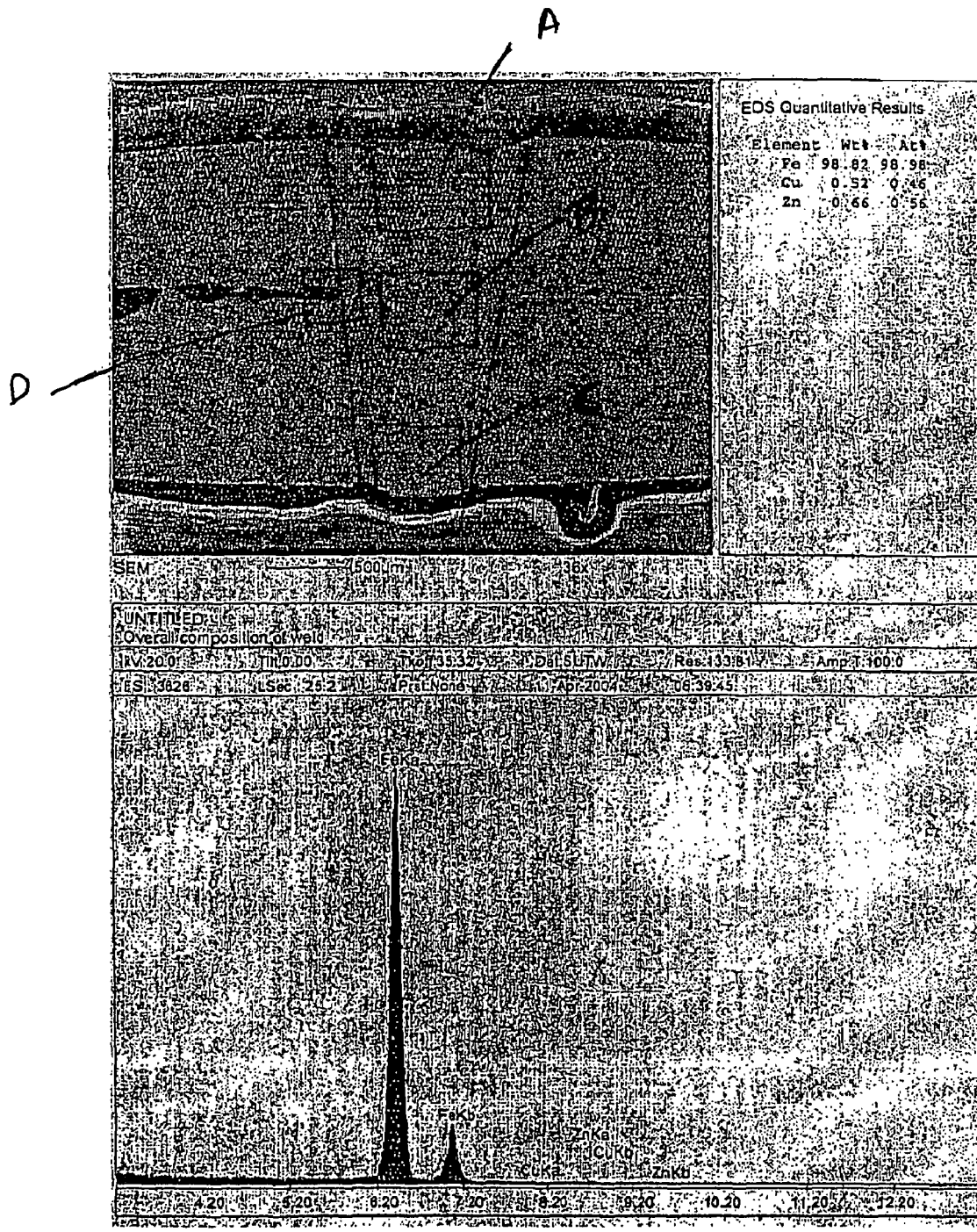
FIG. 3 is an output of an Energy Dispersive X-Ray analysis (EDAX) showing the composition of an exemplary weld according to the present teachings.
Figure 4:
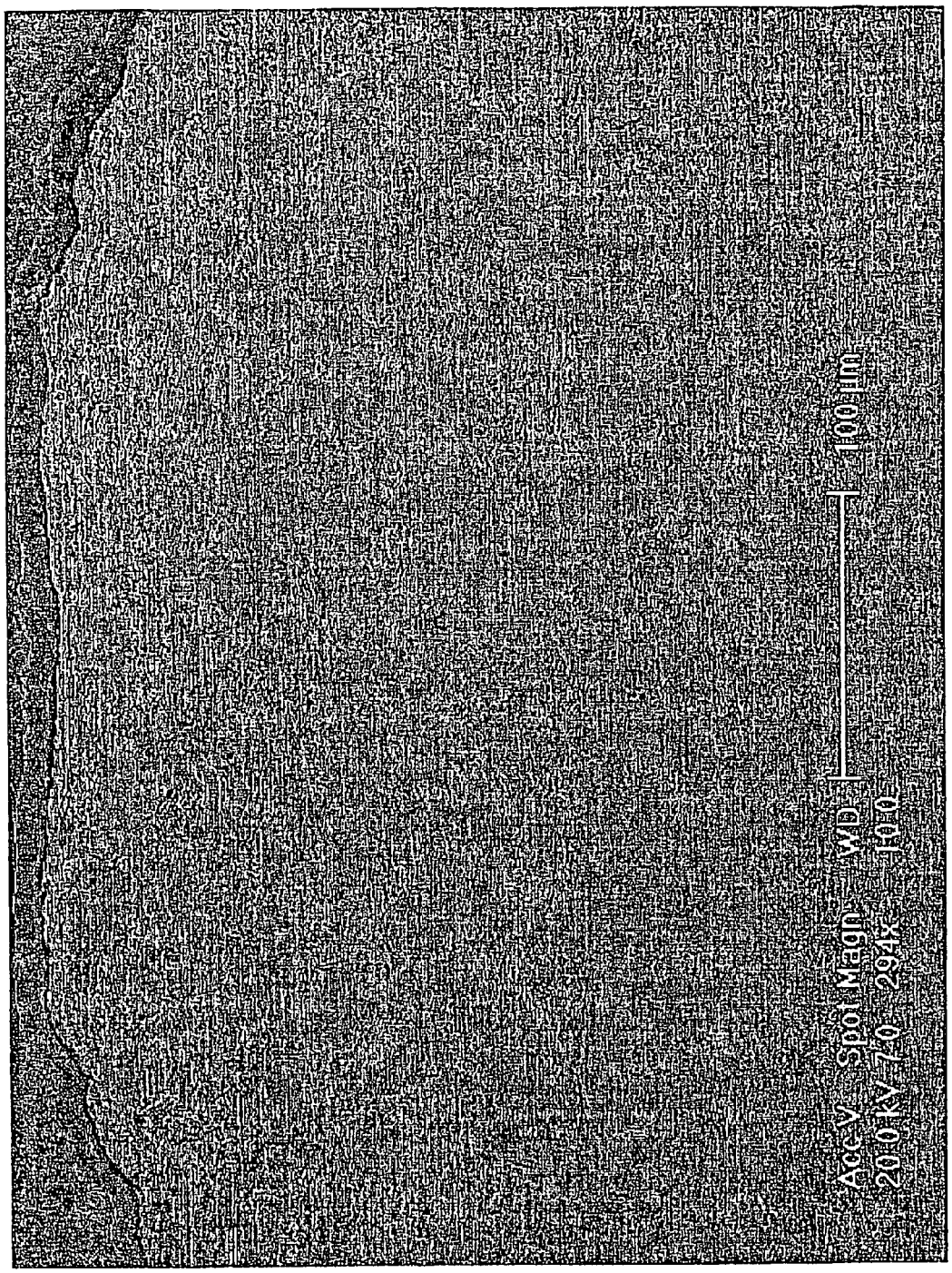
FIG. 4 is a micrograph of a top portion A of the exemplary weld of FIG. 3.
Figure 5:
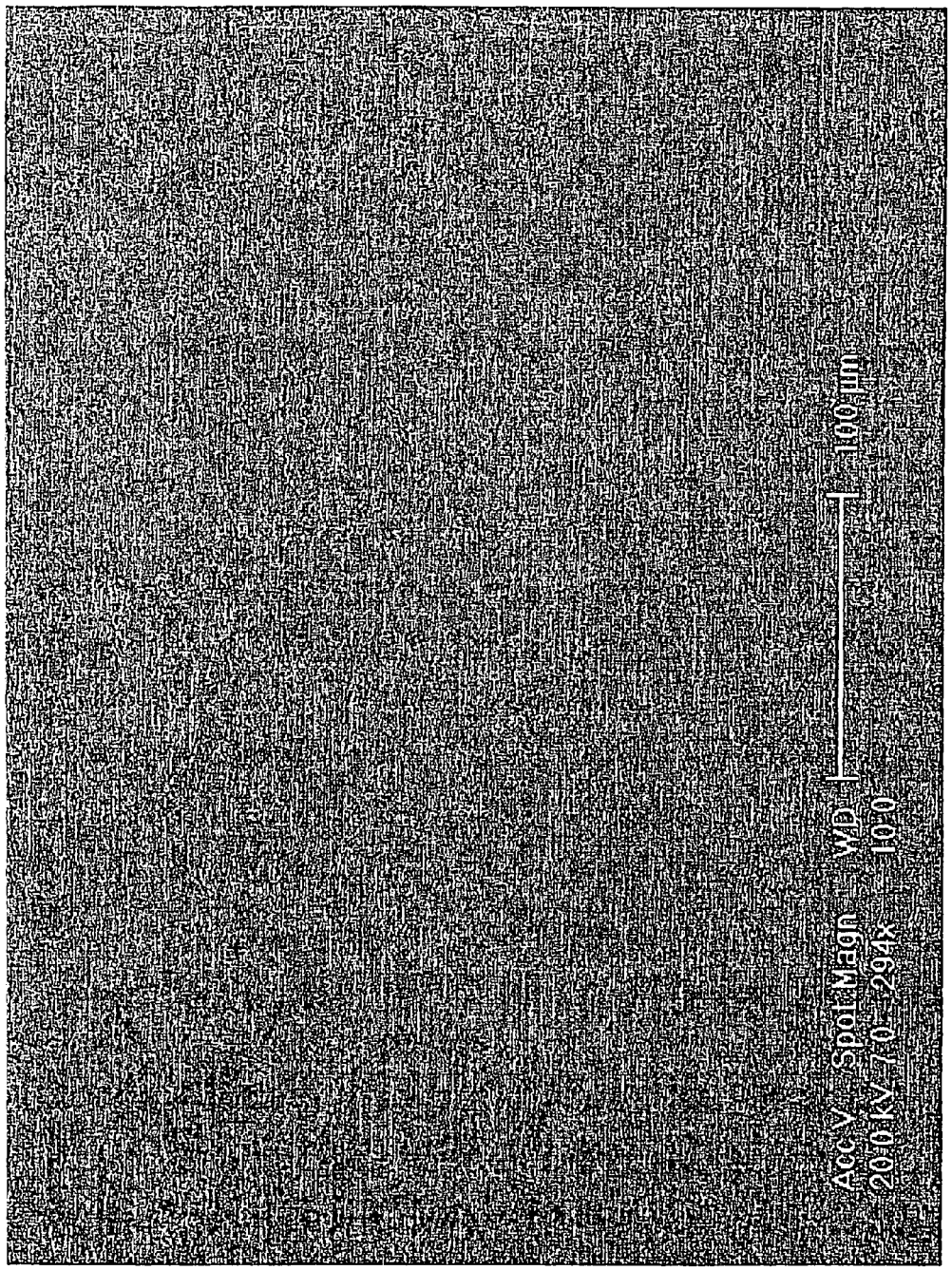
FIG. 5 is a micrograph of a middle portion B of the exemplary weld of FIG. 3.
Figure 6:
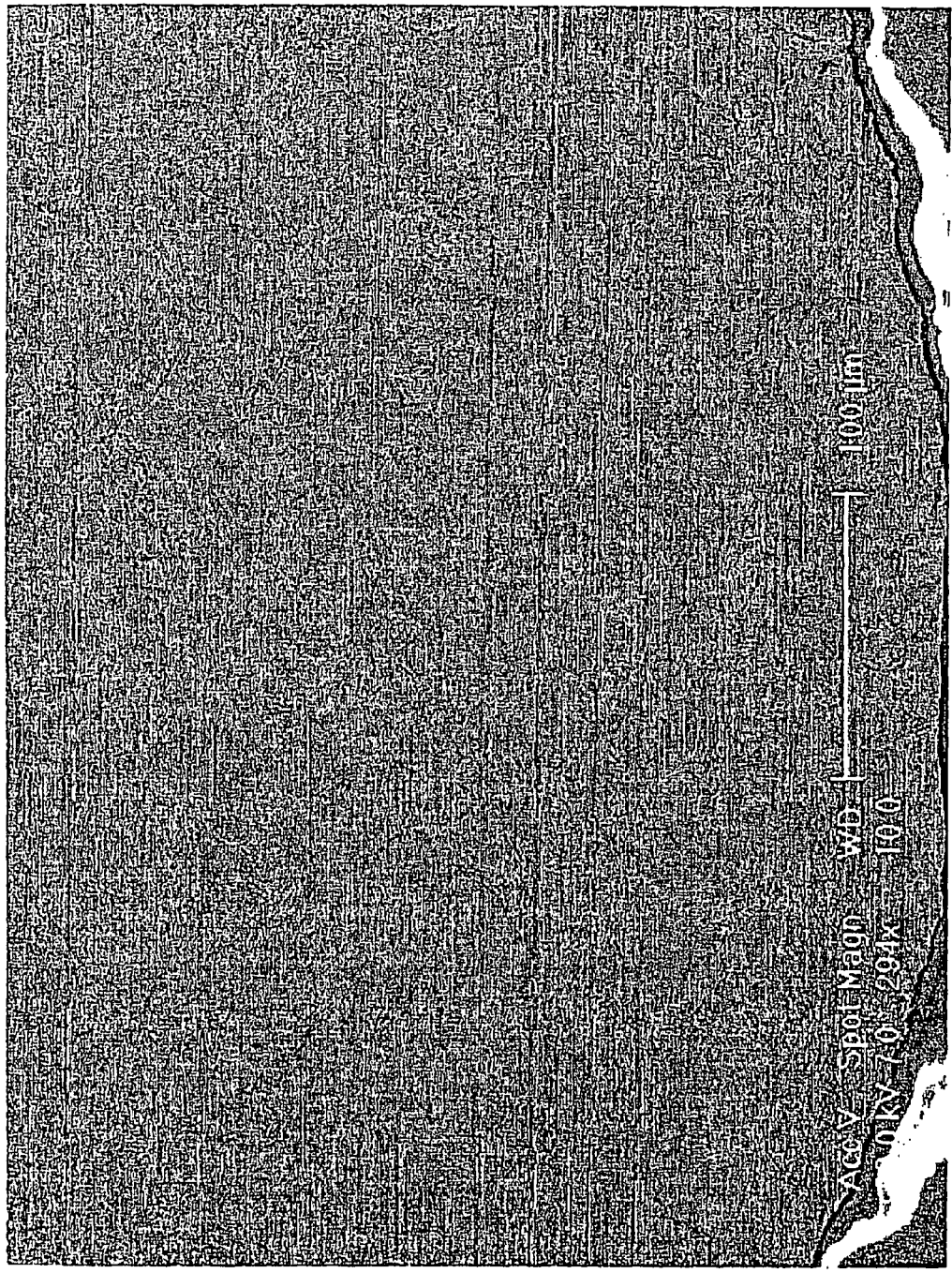
FIG. 6 is a micrograph of a bottom portion C of the exemplary weld of FIG. 3.
Figure 7:
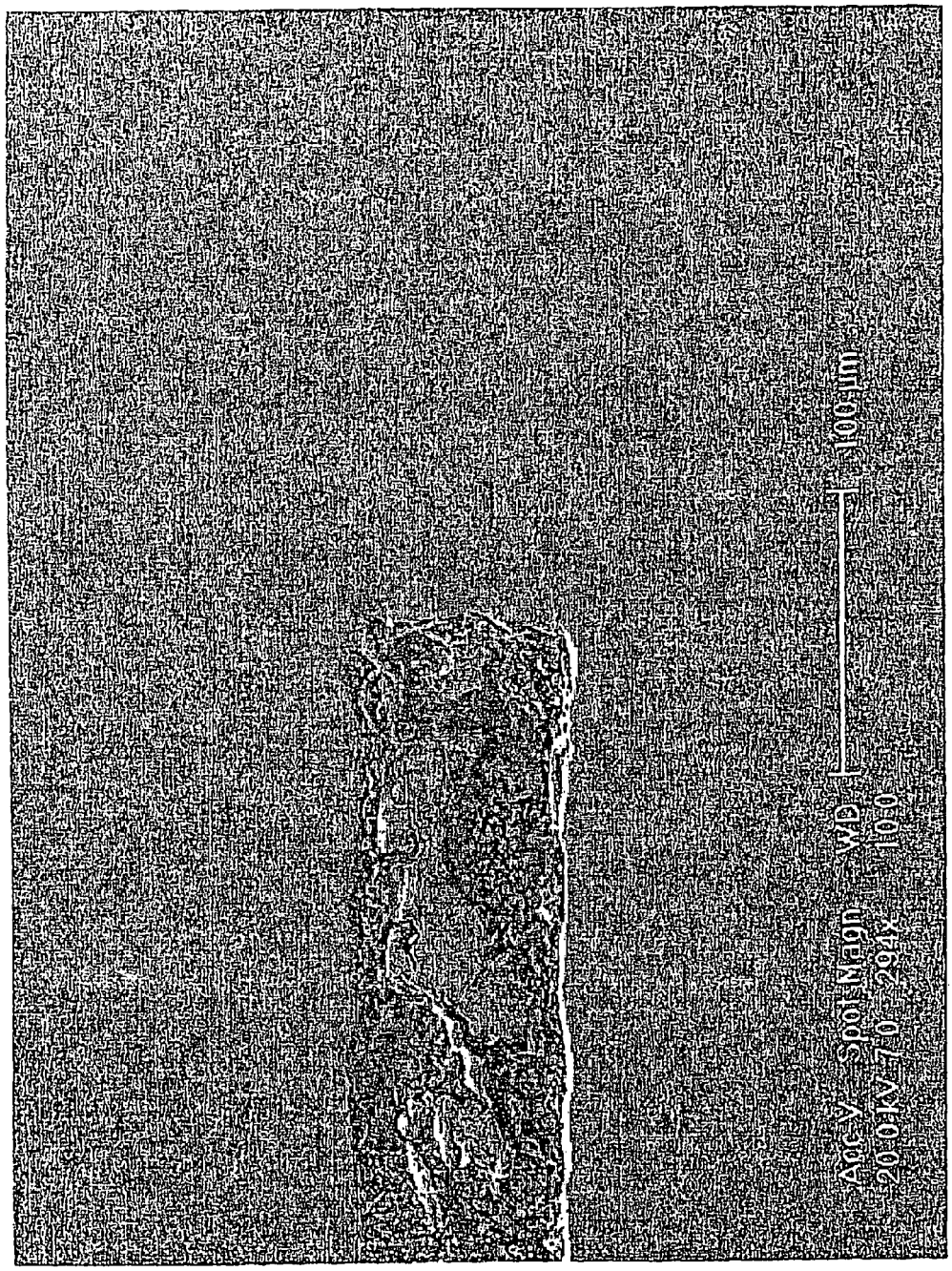
FIG. 7 is a micrograph of an edge portion D of the exemplary weld of FIG. 3.

During the laser process, the cooling rate of the solidification increases, and the solubility of one material within another material increases, since materials that are soluble in the liquid phase become trapped because of lack of sufficient time for diffusion and separation. The increased solid solubility limit during the laser process is defined herein "extend" solid solubility limit. According to the present teachings, the copper content in the weld is monitored carefully and controlled such that the "extended" solid solubility limit of copper in the weld is not exceeded. If the amount of copper in the steel of the weld exceeds the extended solid solubility limit, harmful intermetallic compounds can make the weld very brittle. Referring to FIG. 3, an Energy Dispersive X-Ray analysis (EDAX) analysis of an exemplary weld according to the present teachings shows that the weld has less than 0.52% copper in steel and exhibits good tensile strength. Laser welding often leads to higher cooling rates and extended solid solubility. Therefore, based on the process parameters of the laser welding operation, the amount of allowable copper or other alloying elements in the weld can vary, and is monitored and controlled accordingly.

The copper powder in its melted condition functions as a trapping material for gaseous zinc. Copper and zinc form an alloy, such as, for example, brass. Other alloying elements that have solid solubility in zinc and iron, such as nickel, for example, can also be used. Some possible methods of applying a coating of the alloying agent 40, copper powder, for example, are described below:

A) Suitable size and amount of copper powder can be mixed in a suitable solvent and a thin coat of the mixture can be applied on the steel surface. The size of copper powder can be chosen based on process requirements. The coat can be applied using a spray gun, brush or any other suitable applicator.

B) Suitable size and amount of copper powder can be directly sprayed on the steel surface using an electrostatic powder spray method. Direct spraying may eliminate the need for an additional solvent, thereby improving the weld quality.

C) The copper powder can be thermally sprayed on the steel surface. A micro plasma spraying system can be used to deliver an appropriate size and amount of copper powder on the steel surface. Thermal spraying may also eliminate the need for an additional solvent.

D) in a manufacturing environment, the steel surface comes coated with a very thin layer of oil used in stamping process, and then an appropriate size and amount of copper powder can be sprayed on the surface using a pressurized gun. The copper powder temporarily sticks to the surface.

Figure 2A:
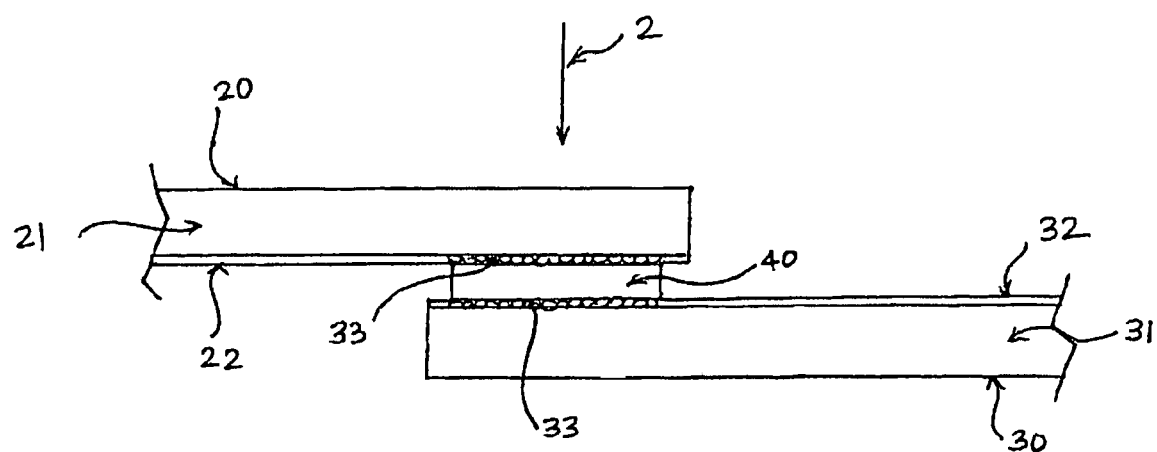
FIG. 2a is an expanded view of detail 2 of FIG. 1, shown at a temperature in which the protective coating is vaporized, and the alloying agent is below its melt temperature.
Figure 2B:
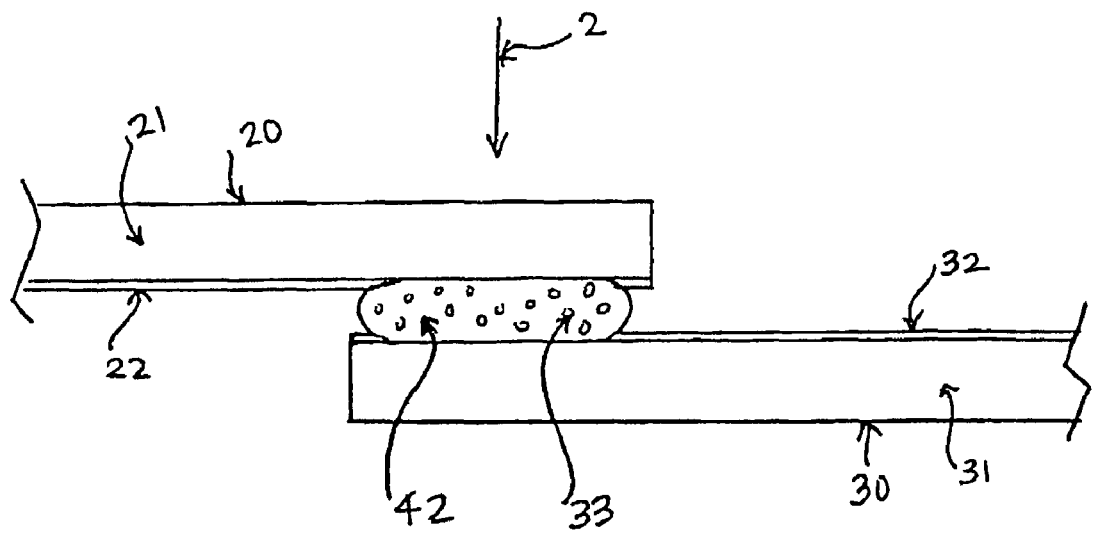
FIG. 2b is an expanded view of detail 2 of FIG. 1, shown at a temperature at which the protective coating is vaporized, and the alloying agent is above its melt temperature, and is trapping and absorbing the protective coating vapors.
Figure 2C:
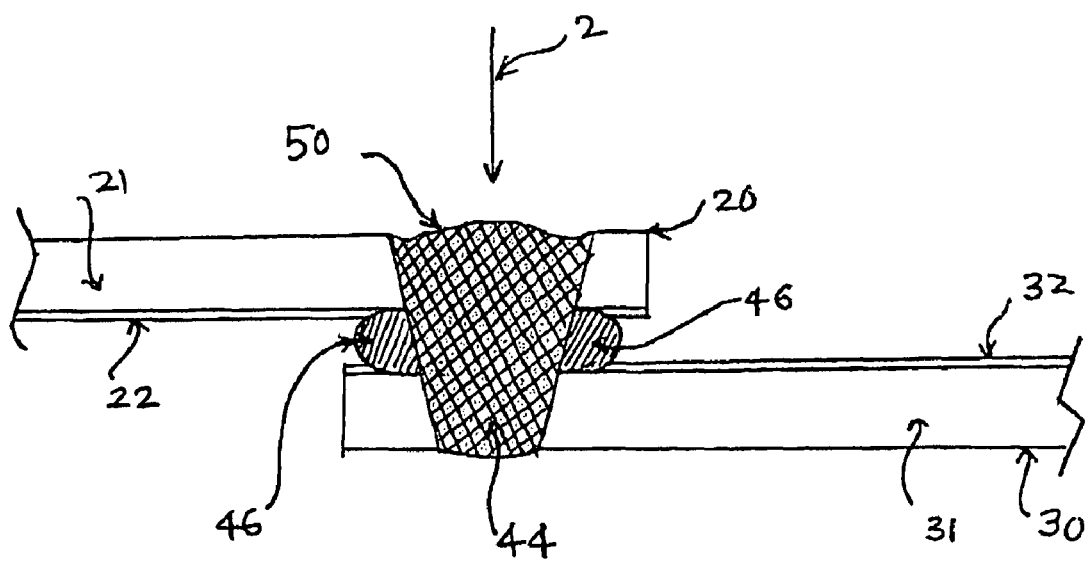
FIG. 2c is an expanded view of detail 2 of FIG. 1, shown after a portion of the overlapping members has melted to form a metal melt pool, and an alloy has formed between the members.

Referring to FIGS. 2a, 2b, and 2c, when welding the first and second members 20 and 30 together, the laser beam 2 is projected through the nozzle 4 to form a heat affected zone in the first and second members 20 and 30, respectively. Those skilled in the art will recognize that the heat affected zone becomes a weld zone 50 (shown in FIG. 2c) that penetrates both the first member 20, the second member 30 and the alloying agent 40 to heat them to their respective melt temperatures.

In the following exemplary description of the welding process and for illustration purposes only, the first and second members are steel members, the protective layer is zinc and the alloying agent is copper powder, although the invention is not limited to these material combinations. The laser beam 2 heats the first member 20, the second member 30 and the alloying agent 40 of copper powder to their melt temperatures. FIG. 2a shows the first and second members 20 and 30 at 907° C., the boiling point of zinc. At this temperature, zinc vapors 33 start forming and tend to become explosive with an increase in temperature. FIG. 2b shows the first and second members 20 and 30 at 1083° C., the melting point of the copper powder. At this temperature, a thin copper melt pool 42 is formed between the first and second members 20 and 30. Since this temperature is higher than the boiling point of zinc, the already existing zinc vapor 33 is trapped in the copper melt pool 42. This condition creates an alloy 46. This alloying reaction is almost complete by the time the first and second members 20 and 30 melt. FIG. 2c shows the first and second members 20 and 30 at 1530° C., the melting point of steel. Prior to the time the weld zone 50 reaches this temperature, most of the zinc vapor 33 becomes alloyed with the copper powder of the alloying agent 40 to form the alloy 46. Thus, when a steel melt pool 44 is formed, very little to negligible zinc is present in the steel melt pool 44 in vapor form 33. Most of the zinc is retained near the weld in the form of the alloy 46. Therefore, the resulting weld joint 100 has negligible, if any, porosity, or cracks and negligible spattering, as illustrated in FIGS. 4-7, which are micrographs of the regions A, B, C, and D respectively of the weld of FIG. 3.

Creating a laser weld joint 100 according to the present teachings will now be described with reference to a particular example. Such an example is not to be taken, however, as a limitation on the invention. The laser used is a 6 kW $CO_2$ RF excited laser made by Trumpf Inc., Farmington, Conn. The laser has a $TEM_{01*}$ beam mode with a focal radius of 0.268 mm and a raw beam radius of 11.456 mm. The distance between the beam source and the members to be welded is adjustable so that the laser beam 2 is able to focus on the desired depth of the first member 20 at the weld zone 50. In a specific example, a laser power of 2800 W is used for lap welding a 0.8 mm thick electro galvanized (EG) steel sheet with a 1.0 mm thick EG steel sheet. The welding speed is 65 inches per minute (ipm), and the Helium shielding gas flow rate is 40 SCFH. The amount of copper is monitored and controlled such that the extended solid solubility limit of copper in steel is not exceeded (or is exceeded by only a negligible amount). The percent porosity of the weld section area in welds made with these parameters is found to be 2% or less. This porosity, although minimal, is attributed to a trace amount of zinc vapor which did not alloy with the copper powder and remained in the steel melt pool 44 till solidification, because of slight deviation above the solid solubility limit, or to any other low melting point impurities. No cracks are formed in the weld zone.

At temperatures above 1083° C., the zinc vapors 33 attempt to escape the weld zone 50 through the copper melt pool 42 where the zinc vapors 33 are trapped and absorbed. During solidification, if some zinc vapor 33 still remains in the copper melt pool 42, pores may form in the alloy metal 46. Such pores, if any, will develop outside the weld zone 50 and do not affect the strength and quality of the weld.

The above described laser welding produces a consistent joint strength of over 200 MPa at 12% or higher elongations, whereas the general safe strength for such joints is about 83 MPa. Thus, the weld joints 100 according to the present teachings are quite strong, have excellent repeatability and satisfy all safety requirements.

The above example is not to be taken as a limitation in the scope of the invention, but merely exemplary of the teachings of the present invention. For example, any high power industrial laser, such as $CO_2$, Nd:YAG, Diode, and Fiber, can be used with appropriate laser power densities and welding speed, and any shielding gas, such as Helium Argon, Nitrogen, air, combinations thereof, and any other shielding gas. Welds can also be made without any shielding gas in applications where moderate oxidation is acceptable. The laser beam can be delivered through a nozzle system or remotely depending on the production system.

The foregoing discussion discloses and describes merely exemplary arrangements of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for laser welding a pair of metal members together, at least one of the metal members having a protective metal coating, the method comprising:
    applying a thin layer of an alloying agent on at least one of the metal members;
    placing one end of one of the metal members in overlapping relation to one end of the other metal member to form an overlapping section, such that the alloying agent is between the first and second members in the overlapping section with zero-gap; and
    laser welding the metal members and the alloying agent together to form a weld, such that the protective metal coating becomes substantially alloyed with the alloying agent to form an alloy, and such that the extended solid solubility limit of the alloying agent in the weld is not substantially exceeded,
    wherein the alloy agent comprises copper powder, the protective metal coating comprises zinc and the metal members comprise steel.

2. The method of claim 1, wherein the metal members comprise steel, the protective coating comprises zinc, and the content of the alloying agent in the weld is not substantially more than about 0.5% for zinc coated.

3. The method of claim 1, wherein applying a thin layer of alloying agent further comprises:
    mixing copper powder in a solvent to form a mixture; and
    applying a thin coat of the mixture.

4. The method of claim 1, wherein applying a thin layer of alloying agent further comprises electrostatically spraying the alloying agent.

5. The method of claim 1, wherein applying a thin layer of alloying agent further comprises thermally spraying the alloying agent.

6. The method of claim 1, wherein applying a thin layer of alloying agent further comprises:
    providing a thin layer of oil; and
    spraying alloying agent on the thin layer of oil.

7. The method of claim 6, wherein providing a thin layer of oil comprises using residual oil from stamping.

8. The method of claim 6, wherein providing a thin layer of oil comprises applying a thin layer of oil.

9. The method of claim 1, wherein laser welding further comprises:
    vaporizing the protective coating to form a vapor; and
    melting the alloying agent to form a liquid, the liquid trapping and absorbing the vapor to form the alloy.

10. The method of claim 1, wherein the weld has a porosity less than about 2%.

11. The method of claim 1, wherein the weld has zero porosity.

12. A method for laser welding a pair of overlapping metal members together, at least one of the metal members having a protective metal coating, the method comprising:
    applying a thin layer of an alloying agent on at least one of the metal members between the metal members;
    melting the protective metal coating and the alloying agent to form an alloy, the alloy disposed between the overlapping members with zero cap;
    laser welding the overlapping metal members together to form a weld with zero gap; and
    controlling the amount of the alloying agent such that the extended solid solubility of the alloying agent in the weld is not substantially exceeded,
    wherein the alloying agent comprises copper powder, the protective metal coating comprises zinc and the metal members comprise steel.

13. The method of claim 12, wherein applying a thin layer of alloying agent further comprises:
    mixing copper powder in a solvent to form a mixture; and
    applying a thin coat of the mixture.

14. A weld joint formed by laser welding, the joint comprising:
    a pair of overlapping metal members defining an overlapping section with zero gap, at least one of the metal members having a protective coating;
    an alloy between the overlapping metal members at the overlapping section, the alloy formed by the protective coating and a thin coating of alloying agent on one of the overlapping metal members, the alloying agent comprises copper powder; and
    a weld formed from a metal melt pool of the metal members, wherein the extended solid solubility limit of the alloying agent in the weld is not exceeded.

15. The weld joint of claim 14, wherein the weld has a porosity less than about 2%.

16. The weld joint of claim 14, wherein the weld has zero porosity.

17. The weld joint of claim 14, wherein the metal members comprise steel, the protective coating comprises zinc, and the content of the alloying agent in the weld is not substantially more than about 0.5%.

18. The weld joint of claim 14, wherein the metal members comprise steel and the protective coating comprises zinc.

19. The weld joint of claim 14, wherein the alloy comprises brass.

20. The weld joint of claim 14, wherein the copper powder has a mesh size of about 325 (about 40 micron).

* * * * *

UNITED STATES PATENT AND TRADEMARK OFFICE
CERTIFICATE OF CORRECTION

PATENT NO. : 7,820,939 B2  
APPLICATION NO. : 11/658446  
DATED : October 26, 2010  
INVENTOR(S) : Jyotirmoy Mazumder et al.

Page 1 of 1

It is certified that error appears in the above-identified patent and that said Letters Patent is hereby corrected as shown below:

Column 3, line 44, after "(EDAX)", delete "analysis".

Column 4, line 9, "in" should be --In--.

Column 8, line 20, Claim 20, "micron" should be --microns--.

Signed and Sealed this
Eleventh Day of January, 2011

David J. Kappos
*Director of the United States Patent and Trademark Office*